(12) United States Patent
Shalvi

(10) Patent No.: US 7,283,590 B2
(45) Date of Patent: Oct. 16, 2007

(54) SIGNAL PROCESSING APPROACH FOR CHANNEL CODING BASED ON INTER-SYMBOL-INTERFERENCE INSERTION

(75) Inventor: Ofir Shalvi, Herzlia (IL)

(73) Assignee: Texas Instruments Incorporated, Dallas, TX (US)

( * ) Notice: Subject to any disclaimer, the term of this patent is extended or adjusted under 35 U.S.C. 154(b) by 663 days.

(21) Appl. No.: 10/659,651

(22) Filed: Sep. 10, 2003

(65) Prior Publication Data

US 2005/0052292 A1    Mar. 10, 2005

(51) Int. Cl.
    H04B 14/04    (2006.01)
(52) U.S. Cl. ..................................... 375/242
(58) Field of Classification Search ................ 375/242, 375/246, 253–254, 293
    See application file for complete search history.

(56) References Cited

U.S. PATENT DOCUMENTS

| | | | | |
|---|---|---|---|---|
| 5,386,202 A | * | 1/1995 | Cochran et al. ............ 332/100 |
| 5,559,835 A | * | 9/1996 | Betts ........................... 375/265 |
| 6,081,620 A | * | 6/2000 | Anderholm .................. 382/194 |
| 6,118,814 A | * | 9/2000 | Friedman ..................... 375/232 |
| 6,185,594 B1 | * | 2/2001 | Hilton et al. ................ 708/270 |
| 6,975,676 B1 | * | 12/2005 | Goodson et al. ............ 375/231 |
| 6,977,888 B1 | * | 12/2005 | Frenger et al. ............. 370/218 |
| 7,065,147 B2 | | 6/2006 | Opfir et al. |
| 7,099,403 B1 | * | 8/2006 | Dagdeviren .................. 375/296 |
| 7,212,582 B2 | | 5/2007 | Zhang |
| 2001/0028630 A1 | | 10/2001 | Burshtein et al. |
| 2004/0132416 A1 | * | 7/2004 | Yee .............................. 455/82 |
| 2001/0239381 | | 10/2006 | Burshtein et al. |

* cited by examiner

*Primary Examiner*—Khanh C. Tran
(74) *Attorney, Agent, or Firm*—Steven A. Shaw; W. James Brady; Frederick J. Telecky, Jr.

(57) ABSTRACT

An inter-symbol-interference (ISI) coder with mapper and linear filter and a technique of channel encoding deliberately inserts inter-symbol-interference (ISI) into the signal using a non-linear precoder to map map input symbol sequences into sequences of extended symbols. Coded output symbols are generated in response to sequences of extended symbols which are selected from the same grid associated with the input symbols to yield a same minimum distance.

6 Claims, 5 Drawing Sheets

SIGNAL PROCESSING APPROACH FOR CHANNEL CODING BASED ON INTER-SYMBOL-INTERFERENCE INSERTION

BACKGROUND OF THE INVENTION

1. Field of the Invention

This invention relates generally to digital communication systems and methods, and more particularly to a technique of channel encoding that deliberately inserts inter-symbol-interference (ISI) into the signal using a non-linear precoder to map data into a lattice that can have much better distance spectrum than an uncoded QAM signal, although it has nearly the same power level.

2. Description of the Prior Art

The channel coding problem is one of the key problems of the area of digital communications. There are numerous existing algebraic coding approaches directed to the channel coding problem, including block coding, lattice coding, trellis coding, convolutional coding and turbo coding, offering a tradeoff between robustness to channel's noise to power level, complexity and delay.

SUMMARY OF THE INVENTION

The present invention is directed to a technique of channel encoding that deliberately inserts inter-symbol-interference (ISI) into the signal using a non-linear precoder to map data into a lattice that can have a much better distance spectrum than an uncoded QAM signal, although it has nearly the same power level.

According to one embodiment, a inter-symbol-interference (ISI) coder comprises:

a mapper operational to map at least one input symbol sequence into a set of multiple sequences of extended symbols; and a linear ISI filter operational to generate coded output symbols in response to the set of multiple sequences of extended symbols.

According to another embodiment, a method of channel coding comprises the steps of:

providing a non-linear precoder; and inserting deliberate inter-symbol-interference (ISI) into an input signal via the non-linear precoder such that input data is mapped into a lattice having a better distance spectrum than an uncoded QAM signal while retaining a substantially unchanged power level from the uncoded QAM signal.

BRIEF DESCRIPTION OF THE DRAWINGS

Other aspects and features of the present invention and many of the attendant advantages of the present invention will be readily appreciated as the invention becomes better understood by reference to the following detailed description when considered in connection with the accompanying drawing figures thereof and wherein:

FIG. 1b illustrates an equivalent implementation of the simple ISI coder shown in FIG. 1a;

While the above-identified drawing figures set forth particular embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION OF THE PREFERRED EMBODIMENTS

The preferred embodiments described herein below are directed to a new approach for channel coding, called Inter-Symbol-Interference (ISI) coding. ISI coding is achieved by inserting deliberate Inter-Symbol-Interference into the signal using a non-linear precoder. This maps the data into a lattice that can have a much better distance spectrum than an uncoded QAM signal, although it has nearly the same power level. The ISI encoder may also pre-equalize the channel's linear distortion, as well as shape the signal, allowing up to 1.53 dB shaping gain. Error spectrum analysis has shown that many simple ISI patterns achieve coding gains that allow reliable operation at data rates that are very near Shannon's bound. The optimal decoder for this code was found by the present inventor to be Forney's MLSD (Maximum Likelihood Sequence Detector). Reduced complexity MLSD approximations, such as the list algorithm and the Fano algorithm, were found to achieve the cutoff rate bound (1.68 dB from Shannon Capacity) with a moderate computational effort.

ISI codes employ signal-processing algorithms from the area of equalization to construct a lattice of signals that have large distances between them, and have nearly the same power as uncoded PAM or QAM signals. This lattice is constructed by inserting Inter-Symbol-Interference (ISI) into the signal using a non-linear precoder, as stated herein before. The present inventor found that coding gains of ISI codes in an Additive Gaussian Noise (AGN) channel can exceed 7 dB, allowing reliable operation only a fraction of a dB from Shannon's bound. These gains may be achieved by Forney's Maximum Likelihood Sequence Detector (MLSD) receiver [Forney, MLSE], as stated herein before. The present inventor found that noise immunity could be improved by 5.5-6 dB, to reach the cutoff rate of the channel by using practical reduced complexity approximations of the MLSD.

An ISI coder is first described herein below, followed by a description of a Quasi-MLSD decoder, and its reduced complexity approximations. The error probability of these decoders is presented, followed by a discussion of the coding gain attributed to some ISI codes. A discussion of simulation results are finally set forth that verify the analytical results.

The ISI-Coder

Consider first the effect of linear filtering on the minimum distance of a symbol sequence. Let $$x(n) = a(n) + \sum_{l \geq 0} f(l) a(n-l)$$

be the output of a monic causal filter F(z) whose input is a sequence of i.i.d. (independent and identically distributed) uncoded data symbols drawn from an M-PAM constellation $\{-(M-1), \ldots, -3, -1, 1, 3, \ldots, M-1\}$. Denote by $d_a^2$ and $d_x^2$ the minimum distances of the sequences a(n) and x(n), respectively. Obviously, $d_a^2$ is simply the minimum distance of the input constellation which is $d_a^2 = 2^2 = 4$.

Assertion $$1 \leq \frac{d_x^2}{d_a^2} \leq \sum_l |f(l)|^2 = \frac{E\{|x|^2\}}{E\{|a|^2\}}$$

Proof of the left hand in-equality: let $x_1 = f * a_1$ and $x_2 = f * a_2$ be two filtered sequences separated by the minimum distance $d_x^2$, and let m be the first index for which $a_1(n) \neq a_2(n)$. Since F(z) is monic and causal, $x_1(m) - x_2(m) = a_1(m) - a_2(m)$. Now, $$d_x^2 = \sum_n |x_1(n) - x_2(n)|^2 \geq |x_1(m) - x_2(m)|^2 = |a_1(m) - a_2(m)|^2 \geq d_a^2.$$

Proof of the left hand in-equality: Let $a_1$ and $a_2$ be two input sequences which differ only in one symbol: $a_1(n) - a_2(n) = d_a \delta(n)$, where $\delta(n)$ is Kronecker's delta sequence, and denote by $x_i(n) = f * a_i(n)$ the corresponding filter outputs. Then, $x_1(n) - x_2(n) = d_a f(n)$ and $$d_x^2 \leq \sum_n |x_1(n) - x_2(n)|^2 = d_a^2 \sum_n |f(n)|^2.$$

Since a(n) is an i.i.d. sequence $$E\{|x|^2\} = E\{|a|^2\} \sum_n |f(n)|^2.$$

Conclusion

The above assertion shows that monic linear filtering improves the minimum distance of an uncoded PAM sequence, but not enough to justify the power increase due to the filtering operation. Well known pre-equalization techniques however, provide tools for linear filtering without suffering from a high power penalty. These tools include Tomlinson Harashima precoding and Trellis precoding.

These tools can be employed to significantly increase $d_{min}$ without increasing the transmitted power, which is exactly what is desired from a good channel code.

Figure 1A:
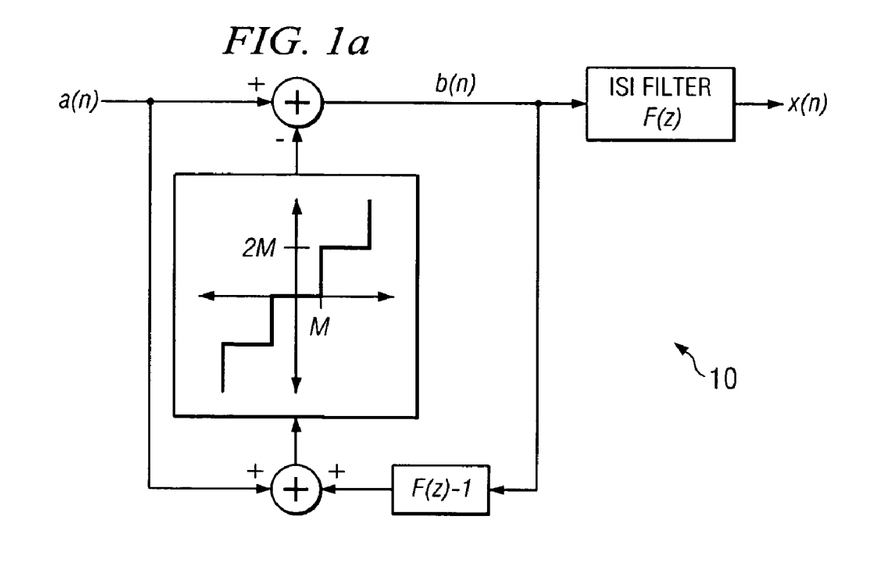
FIG. 1a illustrates a simple ISI coder.

FIG. 1a illustrates a simple ISI coder 10. The input to the coder is a sequence of i.i.d. M-PAM data symbols, a(n). The input symbols are assumed to be uniformly distributed across all the M constellation points. The ISI coder 10 first maps the input symbols sequence into a sequence of extended constellation symbols b(n) that may be regarded as the "state variables" of the encoder 10:

$$b(n) = a(n) - 2M \left[ \left( a(n) + \sum_{l=1\ldots L} f(l) b(n-l) / 2M \right) \right], \quad (1.1)$$

where [x] denotes the integer nearest to x. The output of the ISI coder, x(n), is:

$$x(n) = b(n) + \sum_{l=1\ldots L} f(l) b(n-l), \quad (1.2)$$

where the ISI generating pattern, $$F(z) = 1 + \sum_{l=1\ldots L} f(l) z^{-1},$$

is a monic minimum phase filter (i.e. has a stable causal inverse).

Figure 1B:
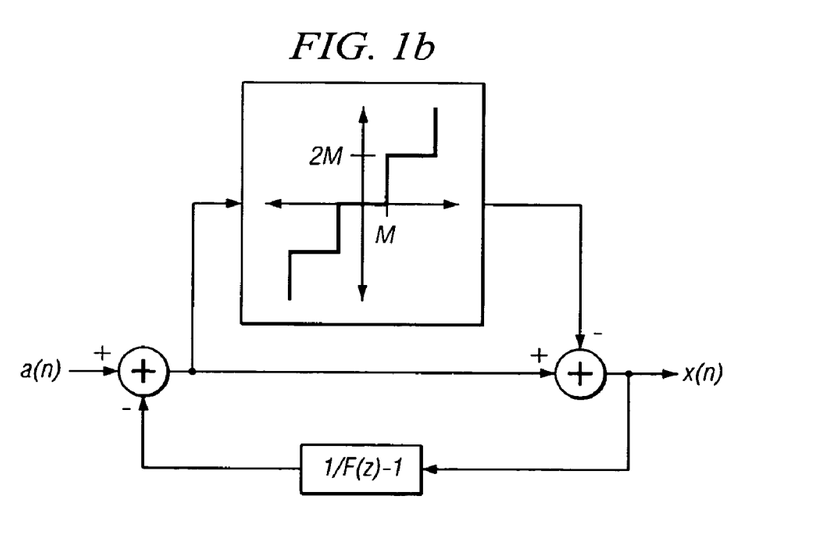

Since b(n) is drawn from the grid of odd integers, that is the same grid of a(n), it has the same minimum Euclidean distance, $d_b^2 = d_a^2 = 4$. According to the above assertion, $d_x^2 \geq d_b^2$, so ISI coding increases the minimum distance of the signal. The question is what is the power increase associated with ISI coding. In order to assess this power increase, we observe that (1.1)-(1.2) fold into (see FIG. 1b):

$$x(n) = a(n) - \sum_{l>0} g(l) x(n-l) - 2M \left[ \frac{a(n) - \sum_{l>0} g(l) x(n-l)}{(2M)} \right], \quad (2)$$

where $$\sum_{l>0} g(l) z^{-1} = F^{-1}(z) - 1,$$

which is exactly a Tomlinson Harashima (TH) precoder. Accurate identity between equation (2) and equation (1) requires g(n) to have an infinite number of taps, but practically, since F(z) is minimum phase, equation (1) can be approximated with equation (2) as well as desired using enough taps. It is well known that besides the case where the g(n)'s are very small, and beside singular values of g(n), the output of a TH precoder is a spectrally white sequence of random variables which are distributed uniformly in the range [−M,M), and the power of x(n) is higher by a factor of $M^2/(M^2-1)$ than the power of the uncoded symbols a(n). This power addition is a relatively small penalty for large M For example, for M=2, 4, 8 and 16, the power increase is 1.25 dB, 0.28 dB, 0.07 dB and 0.03 dB, respectively.

The present inventor has thus shown that the ISI coder may be a good code, since it is capable of increasing the distances between the transmitted sequences almost without any increase of the transmitted power.

The ISI coder 10 shown in FIG. 1a can be immediately generalized to the case of "square constellation" QAM modulation. In this case, a(n) are drawn from the $M^2$-QAM constellation where their real parts and their imaginary parts are statistically independent M-PAM symbols. The ISI coder 10 operates according to eq. (1.1)-(1.2), where in this case [x] denotes the complex integer nearest to x (complex integer is a complex number with integer real and imaginary parts). In this case, the ISI coder's output is distributed uniformly in [−M,M)×[−M,M), and again its power is higher by a factor of $M^2/(M^2-1)$ than that of the ISI coder's input.

Example—a two taps ISI filter: $F(z)=1+f(1)z^{-1}$, $|f(1)|<1$.

In this case it can be shown that the minimum distance at the ISI coder 10 output is $$d_{min}^2 = 4(1 + |f(1)|^2).$$

We therefore can increase $d_{min}^2$ by up to three dB using a two taps ISI filter. This example will be further analyzed in the sequel discussed herein below.

Figure 2:
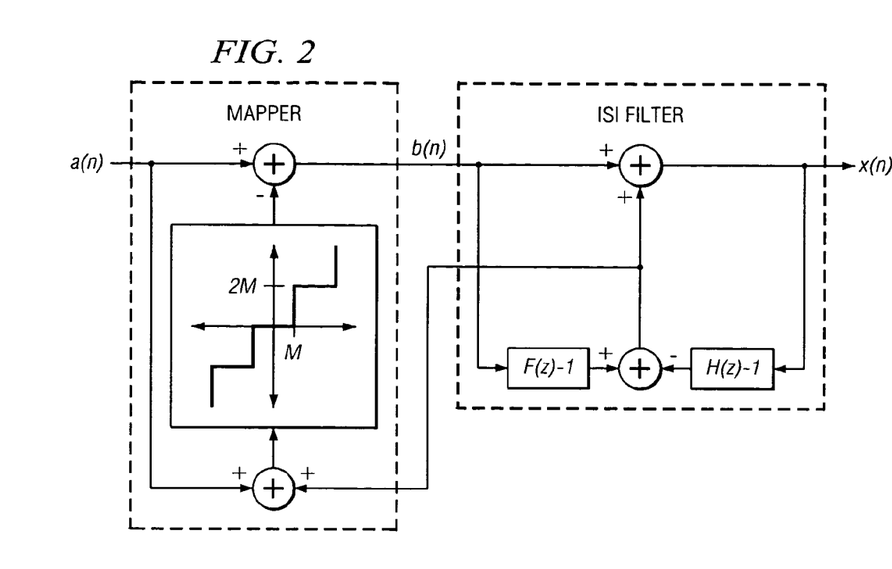
FIG. 2 illustrates an efficient implementation of the simple ISI coder shown in FIGS. 1a and 1b.

ISI coding can be seamlessly combined with pre-equalization, by designing the ISI filter so that its convolution with the channel impulse response will be a desired ISI pattern. Let the channel impulse response, $$H(z) = 1 + \sum_{l=1...L} h(l)z^{-1},$$

be a minimum phase monic filter. As will be shown herein below, with an MLSD receiver, the discrete time channel is indeed minimum phase, since the front-end of the receiver (whitened matched filter) transfers all the maximum phase zeros of the channel inside the unit circle. In this case the ISI filter is F(z)/H(z), where F(z) is the desired ISI generating pattern. An efficient implementation of the ISI coder is shown in FIG. 2 where $$b(n) = a(n) - \qquad (3.1)$$
$$2M\left[(a)(n) + \sum_{l=1...L} f(l)b(n-l) - \sum_{l=1...L} h(l)x(n-l))/(2M)\right],$$

and $$x(n) = b(n) + \sum_{l=1...L} f(l)b(n-l) - \sum_{l=1...L} h(l)x(n-l) \qquad (3.2)$$

The ISI coder for equations (1.1)-(1.2) is limited to square-QAM constellations. Square constellations may be non efficient when the number of data bits per symbol is not an even integer, and they cannot utilize shaping gains that can be achieved by non-square constellations (theoretically up to 1.53 dB and practically nearly 1 dB). In accordance with known techniques that generalize TH to allow shaping and a fractional number of bits per symbol, the present inventor generalized the ISI coder of that depicted in FIGS. 1a-1b to the Generalized ISI Coder (GIC) 100 shown in FIG. 3.

Figure 3:
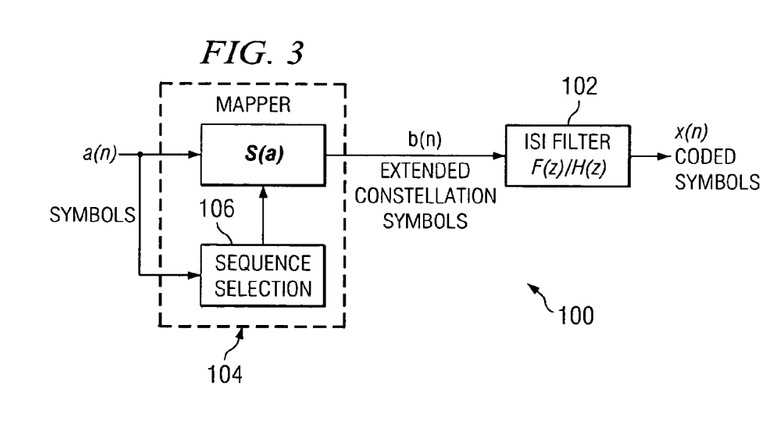
FIG. 3 illustrates a generalized ISI coder.

The GIC 100 can be seen to consist of three functional blocks that include 1) a linear filter 102 (either FIR or IIR), which is designed so that its convolution with the channel's impulse response yield a desired ISI generating pattern, F(z); 2) a "one to many" mapper S(a) 104 which maps every input symbols' sequence a into a set S(a) of multiple sequences of extended symbols, where a̲. the extended symbols are drawn from the same grid of the input symbols (e.g. . . . −1, 1, 3, . . . ) and thus have the same minimum distance, and b̲. the transform S(a) is invertible, that is no two input sequences are mapped into the same sequence of extended symbols; and 3) a Sequence selection algorithm 106, which selects the best sequence from the set S(a) according to a given selection criterion.

Equations (1.1)-(1.2), for example, correspond to the case where S(a) is the set of all sequences a +2 Mm, where m is a sequence of integers, and the selection algorithm seems to be selecting the m which minimizes the peak of the precoder output sequence. The present inventor believes that with a similar S(a), and a selection criterion that is minimization of the power at the output of the ISI coder, one may get significant shaping gains (A shaping gain of 1 dB was achieved using known relatively simple selection algorithms, that may be adopted within GIC 100).

In summary, ISI coding can achieve significant improvement in the minimum distance of the signal, without any noticeable power penalty. The ISI coder can also perform pre-equalization and be cascaded with shaping algorithms such as trellis shaping.

Figure 4:
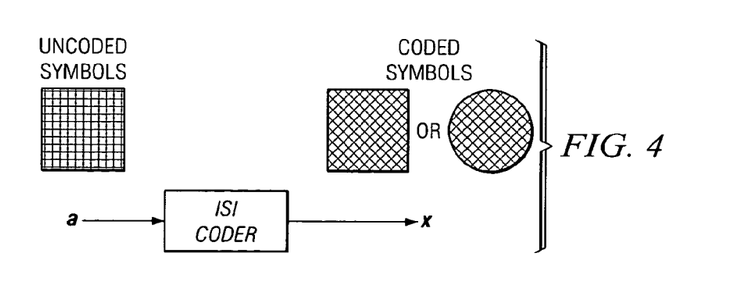
FIG. 4 is a graphic interpretation of the generalized ISI coder shown in FIG. 3.

An intuitive explanation for the operation of the ISI coder 10 can be seen in FIG. 4 by examining the N dimensional vectors a, b and x of inputs, states and outputs of the ISI coder 10. Neglecting initial condition effects, the convolution may be expressed with F(z) as x=Fb, where F is an N×N channel matrix. As demonstrated in FIG. 4, multiplying by F transforms the sequences from the conventional "Cartesian lattice" to a "skewed lattice", and introduces memory into the sequence, which improves the minimum distance. Since F is an upper diagonal matrix with an all-ones diagonal, its determinant is one. This means that the linear transformation from b to x is volume preserving, which explains the x sequences can be packed inside the same multidimensional cube $(-M,M)^N$ that contains the input sequences performed in eq. (1.1)-(1.2). Even better than that, by using a GIC, all the x sequences can be packed inside an N-dimensional sphere having the same volume of the coder's input $(-M,M)^N$ cube, and achieve a lower signal power. ISI codes can be further generalized by replacing the monic filter F(z) with a volume-preserving matrix F that has determinant of one, i.e.:

$$x = F_N b(a),$$

where $x=(x(1) \ldots x(N))^T$ is the coded vector, $F_N$ is an N×N matrix, and b(a) is a vector of re-mapped inputs that is obtained from the uncoded inputs a using the S(a) sets of the GIC as explained above. Some desirable features for $F_N$ are:

a. $F_N$ is an N×N block in $F_{N+1}$; this allows sequential generation of the encoded symbols (x(n)'s).
b. $F_N$ is stable $$\left(\lim_{N\to\infty}\sum_n |F_N^{-1}(k,n)| < \infty \text{ for any } k\right);$$

and has a stable inverse $$\left(\lim_{N\to\infty}\sum_n |F_N(k,n)| < \infty \text{ for any } k\right),$$

this is a generalization of the minimum phase condition, and its purpose is to ensures stability of the encoder (i.e. b(a) does not explode), and proper operation of the decoder.
c. $F_N$ is upper diagonal; this is a generalization of the causality of F(z) and it may simplify the decoder design.

EXAMPLE

Time-varying ISI Pattern $$x(n) = b(n) + \sum_{l=1...L(n)} f(n,l)b(n-1),$$

$$b(n) = a(n) - 2M\left[\left(a(n) + \sum_{l=1...L(n)} f(n,l)b(n-1)/(2M)\right)\right]$$

The present inventor believes that concatenating outputs of multiple filters may allow improved performance similarly to the improvements allowed by concatenated turbo codes.

Although the structure of ISI codes resembles the structure of convolution codes, the concept of ISI codes is different than that of convolution codes or most conventional codes. Conventional codes are based on constructing a set of codewords, which is a subset of the signal set that is matched one-to-one with the set of input sequences and has a good distance spectrum. ISI codes do not use this concept. When trying to interpret ISI coding in terms of conventional coding schemes, ISI coding can be regarded as a new multi-dimensional "lattice code": a lattice that has the same volume as the uncoded lattice, but a better distance spectrum.

Receiver Design

In order to implement an optimal receiver suitable for working with ISI coding, we first assume that the channel is a linear Gaussian channel, whose output is given by:

$$y(t) = \sum_n x(n)h(t-nT) + w(t)$$

where h(t) is the continuous time impulse response of the channel, and w(t) is an AWGN (Additive White Gaussian Noise) signal. In case w(t) is not white, we can whiten it and factor the whitening filter inside h(t). We also assume that the z-transform of $r_{hh}(n)=h(t)\cdot h(-t)|_{t=nT}$ does not have zeros on the unit circle of the z-plane; and we denote by H(z) the minimum phase component (which consists of the roots that are inside the unit circle) of this z-transform. It can be appreciated that in the case of an ideal channel h(t) is a Nyquist pulse, and thus $r_{hh}(n)$ is a Kronecker delta function and H(z)=1, as one may expect. In order to achieve a desired ISI generating pattern F(z), the ISI filter is F(z)/H(z).

The log-likelihood of the received signal y given that the input sequence of a is (up to additive and scaling constants):

$$L(y|a) = -\sum_n \left| y(n) - b(n) - \sum_{l=1...L} f(l)b(n-l) \right|^2, \quad (4)$$

where y(n) is achieved by filtering y(t) by h*(−t), T-spaced sampling and than filtering by 1/H*(z), and where b(n) is the extended symbols sequence that corresponds to a. Note that the b(n)'s depend implicitly on the last L coder states b(n)'s and $L_h$ coder outputs x(n)'s prior to the beginning of the data block, which we assume that are known to the receiver. The MLSD can be obtained by maximizing eq. (4) over all values of a. Using a simpler approach, however: We refer to the b(n)'s as free variables and maximize eq. (4) over all values of the b(n)'s.

The $n^{th}$ likelihood term in eq. (4) can be determined by b(n) and by $s(n)=(b(n-1), \ldots b(n-L))^T$. This suggests a Viterbi Algorithm (VA) whose state is s(n). Some performance improvement and reduction in the number of states may be obtained by "x-range testing", that is by eliminating all the states which correspond to an $$x(n) = b(n) + \sum_{l=1...L} f(l)b(n-l)$$

that falls outside the legal range of the coder's output. When eq. (1) or eq. (2) are used, the legal range is [−M,M) or [−M,M)×[−M,M) for M-PAM and $M^2$-QAM signals, respectively. The present inventor believes that MLSD optimization over a and the proposed optimization over b may coincide, when x-range testing is used. Further investigation can be employed to verify this possibility.

The amount of computations required per each trellis branch is similar to that of a typical TCM (Trellis Coded Modulation) decoder. The ISI decoder requires though L add-multiply operations to calculate $$\sum_{l=1...L(n)} f(l)b(n-l);$$

however this is a relatively small burden, since L is typically quite small, and since the computation should be done only once per father state, and not once per branch. It can be appreciated that the computational effort can be reduced by choosing ISI coefficients f(1) . . . f(L) that can be represented by a small number of bits.

The number of trellis branches of the proposed algorithm is bounded below by $M^{L+1}$ or $M^{2(L+1)}$ for M-PAM and $M^2$-QAM signals, respectively. An upper bound can also be developed. The complexity of the algorithm may therefore be very large compared to the complexity of conventional decoders that achieve similar coding gains. An exception may be the case of low constellations such as QPSK, BPSK or 4PAM, where the number of states of the algorithm may be tolerable. The algorithm in eq. (1) may significantly expand the constellation of b(n) compared to that of a(n); and that may significantly increase the number of states of the approximated MLSD algorithms. The present inventor believes that in the framework of the Generalized ISI Coders (QIC), it is possible to trade some noise margin for a more moderate constellation expansion.

In view of the foregoing discussion, the present inventor proposes using a RSSD (Reduced State Sequence Decoder) approximation to the MLSD algorithm. Those skilled in the art can appreciate there are quite a few RSSD algorithms in the literature. The present inventor considered three classes of RSSD's including:

1. list algorithms: such as the M-algorithm and the T-algorithm. These algorithm are similar to the VA, but they sort the states according to their calculated likelihood value and keep only the M states that have the best likelihood values (M-algorithm), or whose likelihood is within a distance T from the highest likelihood in the list (T-algorithm);
2. sequential algorithms: such as the Fano algorithm and the stack algorithm. These algorithms simultaneously examine trellis-paths of different lengths. They automatically adjust their computational complexity to confront noisy segments in the signal; and
3. The Eyuboglu & Qureshi (E&Q) algorithm: This algorithm is based on partition of the set of all MLSD trellis states into J subsets that have good intra-subset distance. It maintains only one state per each subset, which is the one that has the highest likelihood value.

The present inventor mainly tested the T-algorithm and the E&Q algorithm in order to implement the embodiments described herein, and found that the T-algorithm outperforms the E&Q algorithm. The inventor's results indicated that sequential algorithms can achieve low error probabilities at an SNR close to the cutoff rate with a relatively low complexity.

Error Analysis

The present inventor approximated the error probabilities for a signal coded by the ISI coder of eq. (1.1)-(1.2) in the presence of AWGN with spectral density $N_0$ as follows (Eqs 5 and 6 below are believe to also be a reasonable approximation for the error probabilities of the other ISI coders discussed herein (i.e. the GIC and the case of channel's ISI)): Consider first a receiver based on the Quasi-MLSD algorithm. The Event Error Rate (EER) in this case has been shown to be approximated by:

$$P_{EER} \approx \frac{1}{2} \sum_e P(e) Q\left(d(e) \big/ (2N_0)^{\frac{1}{2}}\right) \quad (5)$$

where the summation in eq. (5) is over all possible errors sequences e in the coder's states b(n), Q is the well-known Gaussian erfc function, $$d^2(e) = \sum_n \left| e(n) + \sum_{l=1\ldots L} f(l)e(n-l) \right|^2$$

is the distance of the error event, and P(e) is the probability that the error e generates a sequence that is allowed by the receiver. P(e)=1 if the decoder does not employ x-range testing. In case x-range testing is employed and the ISI coder is eq. (1) or eq. (2), the present inventor believes that:

$$P(e) = z_{,900} \; _i U(M-|\mathrm{real}(e(i))|/2) U(M-|\mathrm{imag}(e(i))|/2) / M^2, \text{ where } U(x)=x \text{ if } x>0$$

and 0 otherwise.

The Symbol Error Rate (SER) of the MLSD algorithm may be approximated by:

$$P_{SER} \approx \frac{1}{2} \sum_e N(e) P(e) Q\left(d(e) \big/ (2N_0)^{\frac{1}{2}}\right) \quad (6)$$

where N(e) is the number of erred symbols in the error sequence e.

Typically the sums in eq. (5) and eq. (6) will be dominated by the error sequences with the minimum distance, $d_{min}^2$. However, as shown herein below, in many cases the rest of the error spectrum should not be neglected.

The error probability of list and sequential RSSD is typically dominated by Correct Path Loss (CPL) events, in which the algorithm excludes the correct path from its list (or stack). These error events are characterized by long error bursts.

Consider now a receiver based on the E&Q RSSE algorithm. This case is more difficult to analyze than the MLSD decoder, since here the error rate is increased due to early merging events. In order to analyze the error probability of E&Q RSSE [E&Q], we assume that the constellation of each symbol in the VA state vector is divided into j Ungerboeck cosets and that the set of all VA states is divided to $J=j^{L-1}$ subsets correspondingly. The error event probability can be approximated by eq. (5), where in this case:

a. The sum goes over all non-zero error sequences of the type e=(e(l) . . . e(N)), which starts with L zero elements (to eliminate propagation from previous error events), and whose last L elements are a product of a complex integers with the spacing vector of the Ungerboeck coset which is used to partition the set of VA states; and
b. $d^2(e)$ in eq. (5) is replaced by $$d_N^2(e) = \sum_{n=1\ldots N} \left| e(n) + \sum_{l=1\ldots L} f(l)e(n-l) \right|^2, \text{ where}$$

(the error energy excludes the effects at the output of the coder beyond n=N). The error events were divided by [E&Q] into two types including:
1. MLSD error events—The last L elements of e are zero: these are errors that even the MLSD would have; and
2 CPL error events—One or more of the last L elements of e are non-zero: In these errors, the RSSE throws the true state from its trellis, which will typically lead to a long tail of errors.

As discussed herein before, and as the present inventor also observed in simulations, the algorithm suffers from severe error propagation, and due to this phenomenon, eq. (6) is typically not a good approximation in the case of RSSD.

Example revisited—a two taps ISI filter: $F(z)=1+f(1)z^{-1}$, $|f(1)|<1$.

As stated above, the error events $e_1=j^k(\ldots 020 \ldots)$, $k=0 \ldots 3$ achieve the minimum distance $d_{min}^2=4(1+|f(1)|^2)$. This suggests that choosing $|f(1)|\sim1$ may earn 3 dB. However, error events with n errors of the form $e_n=j^k(\ldots 0,2p, 2p^2,\ldots,2p^n,0\ldots)$, $k=0\ldots 3$, where p is the nearest among $\{1,j,-1,-j\}$ to $f(1)$ in the case of QAM, or simply $-\text{sign}(f(1))$ in the case of PAM, have distances $d^2(e_n)=4(1+|f(1)|^2+(n-1)(|p-f(1)|)^2)$. So as $|f(1)|$ approached 1, $d_{min}$ increases, but very many error may become likely. For example, for $F(1)=0.099$, $d_{min}^2$ is better by 2.97 dB than that of the uncoded sequence, but there are 5000 error sequences $e_2 \ldots e_{5000}$ whose distances lie within 1 dB from $d_{min}^2$. This implies that $f(1)\sim1$ may be a poor choice. For QAM signals, this problem may be avoided by choosing $f(1)=Ae^{j\pi/4}$ where $A\sim1$ $A<1$, which may yield the expected 3 dB gain. In addition to that, x-range testing may help combating such long error events.

Analysis and Optimization of Some ISI Patterns

The distance spectrum of some ISI patterns that seem to have very high coding gains are now discussed herein below.

Distance Spectrum Calculation

The present inventor first developed an algorithm to compute the distance spectrum of the ISI code. A brute force approach would be to calculate the distances of all possible error sequences and sort out the minimum distances, but this approach would require a non-practical amount of computations. Instead, the present inventor used an approach proposed by others that is guaranteed to find any error sequence e whose length is below $N_{max}$ and whose distance is below $d_{bound}^2+4|f(L)|^2$ where $d_{bound}^2$ and $N_{max}$ are parameters of the algorithm. The algorithm iteratively builds a tree of error sequences whose leafs are $e_N=(e(1) \ldots e(N))$, sequences of N error terms (i.e. sequences of N even complex valued numbers). The offspring of each leaf $e_N$ is all the error sequences whose first N elements are $e_N$. The idea behind the algorithm is that it can eliminate all the offspring of a leaf $e_N$ whose $d_N^2(e_N)$ is high, since $d_N^2(e_N)$ always increases with N as we travel along a branch of the tree. The algorithm eliminates all leafs such that $d_N^2(e_N)>d_{bound}^2$, and as a result the tree reduces to a finite size. The algorithm does not expand the offspring of error sequences whose last L elements are zero. The Euclidean distance of an error sequence $d^2(e_N)\geq d_N^2(e_N)+4|f(L)|^2$, since $d^2(e_N)$ only measures the first N errors at the coder output, and since any $e_N$ with non-zero last L elements creates a tail of errors for $n>N$ at the coder output, and the magnitude of its last non-zero element in this tail is at least $|2f(L)|$. The algorithm outputs the distances $d^2(e_N)$ of all the tree elements (most of them have very high distances). The $d_{bound}$ parameter should be chosen high enough so that the minimum distance of the code and all the portion of its distance spectrum that significantly effects the error probability are below $d_{bound}^2+4|f(L)|^2$. However, a too high $d_{bound}$ may yield a huge tree size. $N_{max}$ should be chosen such that $d_N^2(e_N)>d_{bound}^2$ for any error sequence of length $N=N_{max}$ (i.e. there are no error sequences of length $N_{max}$ in the tree). Trial results discussed herein below used $N_{max}=120$, and are described for the cases where the tree had error sequences longer than $N_{max}$ symbols.

Finding Good ISI Patterns

The problem of finding the best (or worst) ISI in terms of optimizing $d_{min}$ under power constraint has been addressed in the art by others, which have found that both the best and worst ISI is achieved when all the zeros of the system are on the unit circle of the z-plane. The present inventor recognized a different problem that does not operate under power constraint, and believes that it can be shown that certain ISI patterns whose zeros lies on the unit circle are (at least local) maxima of the minimum distance optimization criterion. The present inventor has found out that ISI patterns that have a deep null near a frequency of 0, $\pm\pi/2$, or $\pi$, have pretty good distance spectra. Table 1 below shows the distance spectra of ISI patterns that have L zeros at $z=Ae^\Phi$. The second column shows the number of zeros of the ISI pattern. The third and the fourth columns show the amplitude and the phase of the zeros of the ISI pattern. The fifth and the sixth columns show the distances and the number of erred symbols of the minimum distance error events. The seventh column shows the expected SNR gain at an event error rate of $10^{-6}$ compared to an uncoded 64-QAM signal, calculated using eq. (5) assuming $P(e)=1$, and taking into account the 0.07 dB power increase due to ISI coding. The bold letters show the gain taking into account only the $d_{min}$ event, while the gain in regular letters takes into account all the distance spectrum that was mapped (in some cases only a small portion of the spectrum was mapped). The eighth column shows the lowest distance that may be missed by the analysis algorithm. The ninth column is the size of the tree spanned by the algorithm, and in parenthesis we see the number of elements of length $N_{max}$ symbols that were left in the tree.

TABLE 1

| L | A | Φ | Distance spectrum | Error length | Gain [dB] | $d_{bound}^2 + 4|f(L)|^2$ | Tree size |
|---|---|---|---|---|---|---|---|
| 1 | 0 | 0 | 4 (an uncoded signal) | 1 | 0 | — | — |
| 2 | 2 | 0.9 | 9π/8 | 14.811 | 3 | 5.6 | 17.6 |
|   |   |   | 15.01 + .0865 m m = 1, 2 … m + 1 |   | 4.8 |   |   |
|   |   |   | 15.241, 15.293 | 9, 5 |   |   |   |
|   |   |   | 15.63, 16.74 | 8, 8 |   |   |   |
|   |   |   | 16.89, 16.92 | 8, 13 |   |   |   |
|   |   |   | 17.46 | 7 |   |   |   |
| 3 | 2 | 0.95 | 9π/8 | 16.33 | 3 | 6.0 | 18.25 |
|   |   |   | 16.57, 16.674 | 9, 5 | 5.2 |   |   |
|   |   |   | 16.59 + .0866 m m = 1, 2 … m + 1 |   |   |   |   |
|   |   |   | 16.98, 17.63 | 8, 13 |   |   |   |
| 4 | 2 | 0.98 | 9π/8 | 17.33 | 3 | 6.25 | 19.69 |
|   |   |   | 17.526, 17.64 | 9, 5 | 5.7 |   |   |
|   |   |   | 17.62 + .0895 m m = 1, 2 … m + 1 |   |   |   |   |
|   |   |   | 18.453, 19.34, 19.62 | 13, 8, 8 |   |   |   |

TABLE 1-continued

| | L | A | Φ | Distance spectrum | Error length | Gain [dB] | $d_{bound}^2 + 4|f(L)|^2$ | Tree size |
|---|---|---|---|---|---|---|---|---|
| 5 | 3 | 0.9 | $9\pi/8$ | 17.93 | 10 | 6.45 | 20.12 | 60,000 |
| | | | | 17.98, 18.97 | 5, 13 | 6.15 | | |
| 6 | 3 | 0.95 | $9\pi/8$ | 20.53 | 10 | 7.03 | 24 | 741000 |
| | | | | 20.74, 21.87 | 5, 13 | 6.7 | | |
| | | | | 25.38, 25.84 | 7, 18 | | | |
| | | | | 26.59 | 17 | | | |
| 7 | 3 | 0.97 | $1.09\pi$ | 22.90 | 5 | 7.50! | 25 | 1,174,200 (3) |
| | | | | 25.07, 25.08 | 12, 13 | | | |
| | | | | 26.22 | 11 | | | |
| 8 | 3 | 0.98 | $1.09\pi$ | 23.59 | 5 | 7.64! | 26 | 2,225,000 (3) |
| | | | | 25.79, 25.83 | 12, 13 | | | |
| | | | | 26.96 | 19 | | | |
| 9 | 4 | 0.7 | $1.08\pi$ | 14.27 | 12 | 5.45 | 18.23 | 62700 |
| | | | | 16.17, 16.37, | 19, 5, | 5.25 | | |
| | | | | 16.99, 17.22, | 11.9 | | | |
| | | | | 17.53, 18.04, 18.15 | 15, 14 | | | |
| 10 | 4 | 0.8 | $1.08\pi$ | 18.2 | 12 | 6.51 | 21 | 145000 |
| | | | | 20.22, 20.79 | 19, 14, | 6.3 | | |
| | | | | 21.13, 21.43, | 11, 9, | | | |
| | | | | 21.48, 21.90 | 19, 15 | | | |
| | | | | 22.37, 23.43 | 11, 15 | | | |
| 11 | 4 | 0.85 | $1.08\pi$ | 21.52 | 12 | 7.24 | 23 | 1,330,000 (18) |
| | | | | 23.51, 23.97 | 14, 19 | | | |
| | | | | 24.45, 24.76 | 19, 11 | | | |
| | | | | 24.94, 25.98 | 9, 11 | | | |
| 12 | 4 | 0.86 | $1.08\pi$ | 22.3 | 12 | 7.40 | 23 | 1,208,000 (15) |
| | | | | 24.20, 24.85, | 14, 19 | | | |
| | | | | 25.23, 25.62, | 19, 11 | | | |
| | | | | 25.77 | 9 | | | |
| 13 | 4 | 0.875 | $1.08\pi$ | >23 | 12 | 7.63 | 23 | 1,037,000 (7) |
| | | | | <23.54 | 14, 19, 19, | | | |
| | | | | 25.32, 26.26, 26.50 | 11 | | | |
| | | | | 27.00 | | | | |
| 14 | 4 | 0.90 | $1.08\pi$ | >23 | 12 19 | >7.89 | 23 | 793650 (1) |
| | | | | <25.82, 28.85 | | <8.03 | | |
| 15 | 4 | 0.95 | $1.08\pi$ | >24 | 12 | >7.46 | 24 | 935416 |
| | | | | <31.27 | | | | |

Looking at patterns with L=2 zeros, we observe that even such short ISI codes can achieve hefty gains of 5-6 dB. Note the set of error sequences $e_m = j^k( \ldots 0, 2, -2, \ldots 2(-1)^m, 0 \ldots )$, $k=0 \ldots 3$, $m=1, 2, \ldots$, whose distances decay pretty slowly with m (e.g. in the case of ISI pattern 2, $d^2(e_m) = 15.01 + 0.0865m$). These error sequences degrade the SNR gain of the code by 0.5-0.8 dB.

Looking at patterns with L=3 zeros, we observe the gain of ISI codes can surpass 7 dB. If we add to that a shaping gain of 1.53 dB, assuming an optimal shaping algorithm, these results imply that we can improve the SNR of QAM by nearly 9 dB. Now, it is well known that the gap between the SNR budget required by QAM to achieve an error rate of $10^{-6}$ and the SNR required according to Shannon bound to communicate reliably at the corresponding data rate is also 9 dB. This means that a receiver that approximates the MLSD performance for such ISI patterns can operate at SNR levels that are within fractions of a dB of the Shannon capacity. However, there is a disclaimer to this ambitious statement. As the gain of the ISI pattern exceeds 7 dB, the tree of the Aulin algorithm starts to grow to mammoth sizes. This may imply that it would be very difficult to approximate an MLSD receiver with a practical algorithm. In any case, as shown in simulations, RSSD algorithms are capable of achieving a 5.5-6 dB gain and approaching the cutoff rate when the high gain ISI patterns of table 2 shown below are used.

Looking at ISI patterns with L=4 zeros, we observe that a mild spectral null, A=0.7-0.8, gives a gain of 5.5-6.5 dB. For the deeper nulls, A=0.85-0.86, the error tree is so large that the present inventor could not analyze the distance spectrum beyond finding $d_{min}$. For the deepest nulls, A>0.86, the error tree was so large that the present inventor could not even find $d_{min}$. However, $d_{min}^2$ can be lower-bounded by $d^{bound2} + 4|f(L)|^2$ which corresponds to impressive gains of 7.5 dB. Distances of error events that were found by algorithm bound $d_{min}^2$ from above.

The present inventor observed a neat symmetric structure of the low distance error sequences: In an error sequence of N errors, e(N−n) is equal e(n) up to a possible conjugate operation and multiplication by 1, −1, j or −j. A similar error sequence structure (but for the real valued case) has been shown by others skilled in the art.

Analysis and Optimization of the E&Q RSSD

The ISI patterns in table 1 have good distance spectra for an MLSD decoder, but when the E&Q RSSE decoder is used, they may suffer from CPL error events that have significantly lower distances. The E&Q RSSD algorithm is generally outperformed by the list and the sequential RSSD algorithms, but the prior analysis of its error probability by others allows optimizing the ISI pattern towards improved RSSD performance.

Although the Aulin algorithm has been shown by others that it can be modified to analyze the error events of RSSD, the present inventor took a simpler approach: The RSSD algorithm was run at low SNR conditions and the errors events were mapped at the decoder's output. Table 2 below summarizes the distances of RSSE error events for an ISI pattern which has two zeros at $0.9e^{j9\pi/8}$. The last columns in Table 2 show the minimum distance error sequence that leads to a CPL event.

a real/imaginary component of a QAM symbol) per iteration, while all the other decoders detect a QAM symbol per iteration. The second ISI pattern was selected by a grid search among the entire stable single zero ISI patterns. It achieves a gain of 2.5 dB with an RSSE decoder that has a trellis of 16 branches. Note that by increasing |f(1)| towards

TABLE 2

| J | States number | Branch number | Coset spacing | Distances | Gain [dB] | $e_{min}$ |
|---|---|---|---|---|---|---|
| 4 | 16 | 64 | 4 | 8.66, 8.97, 9.40, 9.58, 9.87, 11.12, 11.18, 11.21 | 3 | 2, −2 − 2j, 4j, 4 − 4j, . . . |
| 8 | 64 | 512 | 4 + 4j | 11.18, 12.02, 12.12, 12.28, 12.34, 12.51, 12.85, 12.99, 13.13 | 4 | 2, −4 − 2j, 4 + 4j, −4 − 4j, . . . |
| 16 | 256 | 4096 | 8 | 12.28, 12.34, 12.85, 14.06, 14.51, 14.81 | 4.4 | 2, −4 − 2j, 4 + 6j, −2 − 10j, −2 + 12j, 6 − 12j, −10 + 10j, 14 − 6j, −16, 16 + 8j, . . . |

As shown in Table 1, for this ISI pattern, a minimum distance of 14.81 and a gain of 4.9 dB would be obtained by an MLSD decoder. However, as can be seen from Table 2, the gains of an E&Q RSSD detector with this ISI pattern are only 3,4, and 4.4 dB for J=4,8, and 16 cosets, respectively. Moreover, since the RSSE errors are dominated by CPL error events, the E&Q RSSD decoder is characterized by very long error bursts for this ISI pattern. In order to address this problem, the present inventor developed an iterative algorithm to search ISI patterns that enhance the performance of an E&Q RSSD decoder. This algorithm iterates between mapping the distance spectrum of the ISI pattern 1, the minimum distance of the algorithm is increased from 7.61 towards 8; however on the other hand, the distances of the RSSD CPL errors are reduced. The third ISI pattern was achieved by some optimization over two zero ISI patterns, and it achieves a gain of 3.5 dB with an RSSD trellis of 64 branches. It can be seen that these ISI codes and E&Q RSSD are still less desirable than at least one other known TCM in terms of their performance versus complexity tradeoff, but not by far. As shown in the simulations, the section T-algorithm RSSD and sequential RSSD outperform the E&Q RSSD as well as this at least one other known TCM.

TABLE 3

| ISI pattern | J | Cosets Num. | Branch Num. | Gain [dB] | MLSD err distances | RSSE err Distances | Symbols-Errs per Err Event |
|---|---|---|---|---|---|---|---|
| $1 + 0.8z^{-1}$ | 2 | 2 | 4 | 1.7 | 6.56, 6.72, 6.88 | >8 | 4.5 |
| $1 + (.883 + .350i)z^{-1}$ | 4 | 4 | 16 | 2.55 | 7.61, 8.25, 8.70 | 9.16, 9.24, 9.48 | 5 |
| $1 + (1.243 + .5358i)z^{-1} + (.270 + .2872i)z^{-2}$ | 4 | 16 | 64 | 3.5 | 10.04, 10.29, 10.41 | 10.09, 10.49, 10.84 | 10 | and steepest descent adaptation of the ISI pattern taps to minimize the Symbol Error Rate determined via eq. (6). These events are given high weights N(e) in order to avoid CPL events. Although this algorithm is still under construction, it has been found by the present inventor to reach non-stable ISI patterns that have zeros outside the unit circle. Thus, even after this problem has been resolved, there is no guarantee that the SER criterion of eq. (6) does not have local minima that will cause the algorithm to converge to sub-optimal solutions. Table 3 shows the distance spectra of some ISI patterns that have been optimized for RSSD decoding. The table shows the ISI pattern, the parameters of the RSSE decoder, and the distance spectrum for both MLSD errors and RSSE exclusion errors. Again, the table shows the SNR gain at an event error rate of $10^{-6}$ compared to an uncoded 64-QAM. The average number of erred symbols per error events is also shown (assessed via simulations). The first ISI pattern allows a gain of 1.7 dB, with a low complexity RSSE decoder that has only 4 branches in its trellis. Note that this decoder detects a PAM symbol (or Simulation Results The present inventor tested the ISI coder in eq. (1) for the case where the channel is ideal and the receiver is the E&Q RSSE algorithm without any x-range testing. The results are discussed herein below with respect to FIGS. 5-7.

Simulation Test 1—Small Code Gain, Simple E&O Decoder

Figure 5:
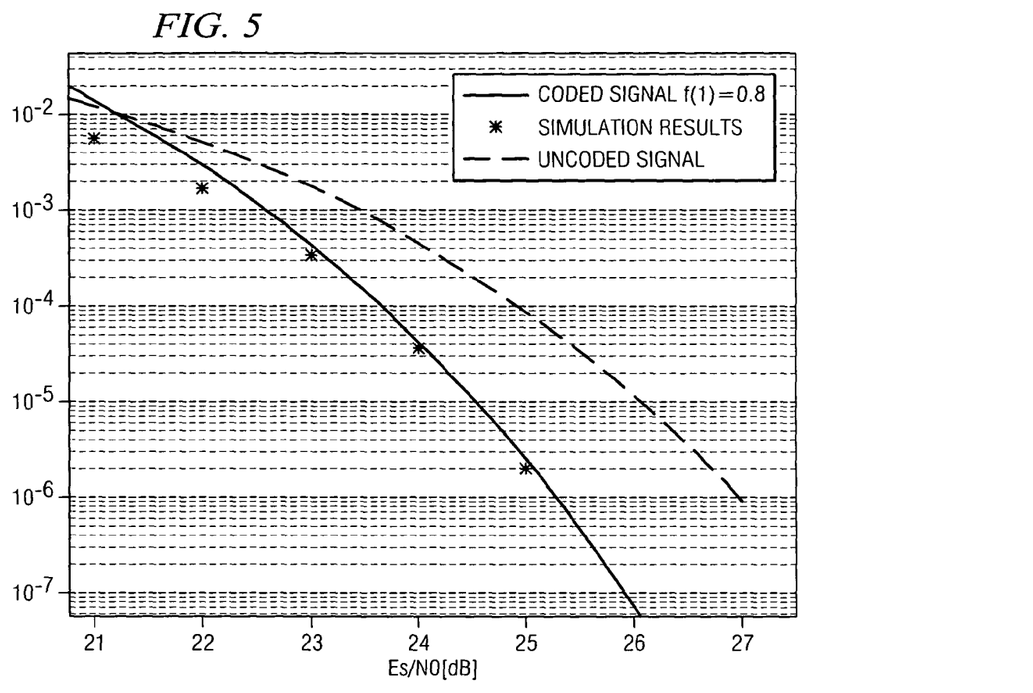
FIG. 5 illustrates simulation test results associated with the ISI coder shown in FIG. 1 showing Event Error Rate versus the Signal to Noise Ratio for an ISI pattern $F(z)=1+0.8z^{-1}$ and an 8-PAM input.

FIG. 5 shows the Event Error Rate (EER) versus the SNR (Es/N0 [dB]) according to eq. (5) for an ISI pattern F(z) =$1+0.8z^{-1}$ and an 8-PAM input. The figure shows the EER obtained by an E&Q RSSD decoder with J=2 cosets. It can be seen there is an excellent match between the analytic curve (bold line) and simulation results (in '*'). In this case, even such a simple decoder that has only 2 states and 4 branches, is capable of gaining the full coding gain of the ISI code, which is about 1.75 dB at error rate of $1e^{-6}$. According to eq. (5), employing x-range testing would only reduce the EER by 30-40%, which is equivalent to only a 0.1-0.15 dB improvement in the coding gain.

Simulation Test 2—Larger Code Gain, More Complicated E&Q Decoder

Figure 6:
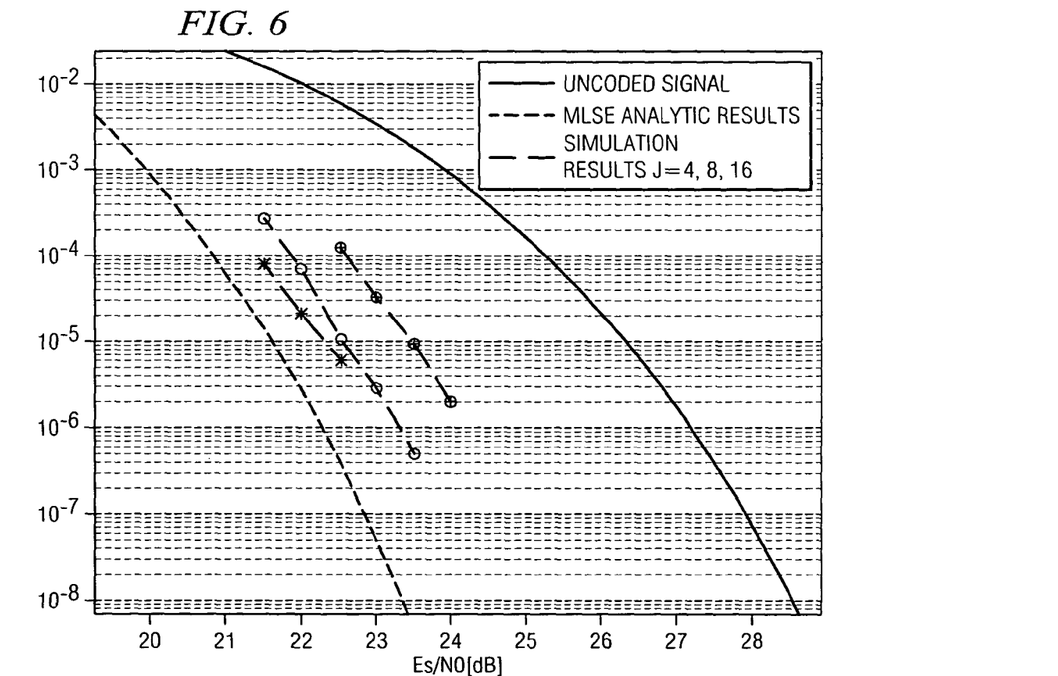
FIG. 6 illustrates simulation test results associated with the ISI coder shown in FIG. 1 showing Event Error Rate versus the Signal to Noise Ratio for an ISI pattern $F(z)$ that has two zeros at $z=-0.9e^{j\pi/8}$, and an 64-QAM input.

FIG. 6 shows the Event Error Rate (EER) versus SNR according to eq. (5) for an ISI pattern F(z) that has two zeros at $z=-0.9e^{j\pi/8}$ and a 64-QAM input. The figure shows the EER obtained by an E&Q RSSE algorithms with J=4, J=8, and J=16 cosets. It can be observed that the moderate complexity algorithm with J=4 achieves a coding gain of about 3 dB, and the more complex RSSE algorithms with J=8, 16 achieve coding gains of about 4 dB. This is in agreement with the analytic error predicted in table 2 (up to 0.2 dB). Since the RSSE errors are dominated by exclusion of the correct path from the trellis, the algorithm suffers from long error bursts. The average number of erred symbols per error burst was in the range of 30-70 for J=8, 16, and 500(!!) for J=4.

Simulation Test 3—J-algorithm Decoder

Figure 7:
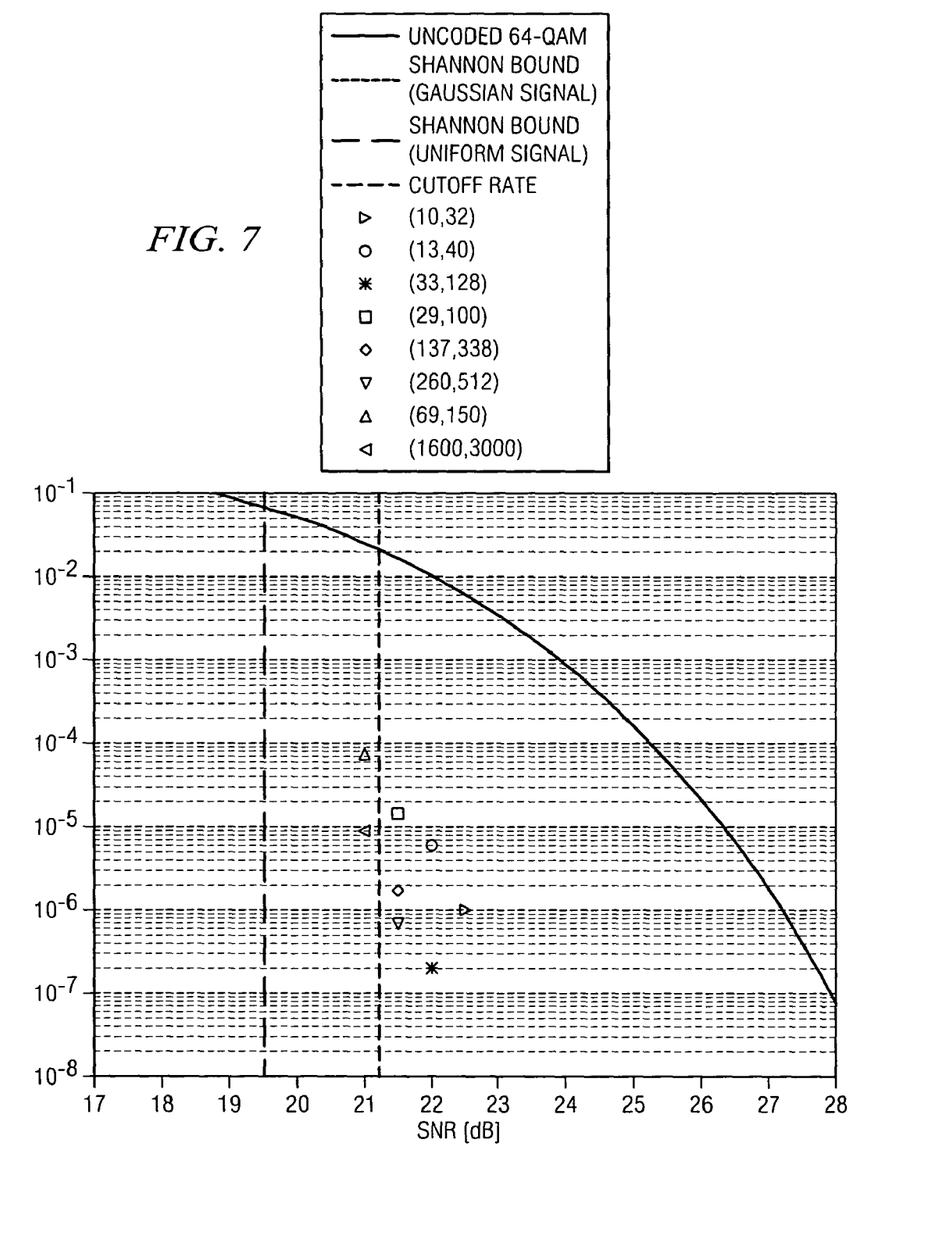
FIG. 7 illustrates simulation test results associated with the ISI coder shown in FIG. 1 showing Event Error Rate versus the Signal to Noise Ratio of a T-algorithm RSSD for an ISI pattern $F(z)$ that has three zeros at $z=-0.95e^{j\pi/8}$.

FIG. 7 shows the error event rate versus Es/NO of a T-algorithm RSSD for an ISI pattern that has three zeros at $z=0.95e^{j\pi/8}$. According to Table 2, this ISI pattern yields a gain of 6.7 dB. The numbers in "( )" are the average number of paths per symbols and the list size.

The vertical lines show the Shannon bound for shaped (Gaussian) signals at a SNR of 18 dB; and 1.53 dB above it is seen the Shannon bound for an un-shaped signal; and another 1.68 dB higher is seen the cutoff rate.

It can be seen that reasonable complexity provides an error probability of $1e^{-6}$ at SNR levels of 21.5 dB. This is 0.3 dB above the cut-off rate and 5.7 dB better than an un-coded signal. For a SNR of 21 dB, which is 0.2 dB below the cut-off rate, there is a dramatic increase in the average and the maximum list size; and yet the algorithm was not able to reach an error probability below $1e^{-5}$.

Simulation Test 4—Sequential/"-algorithm Decoder

Figure 8:
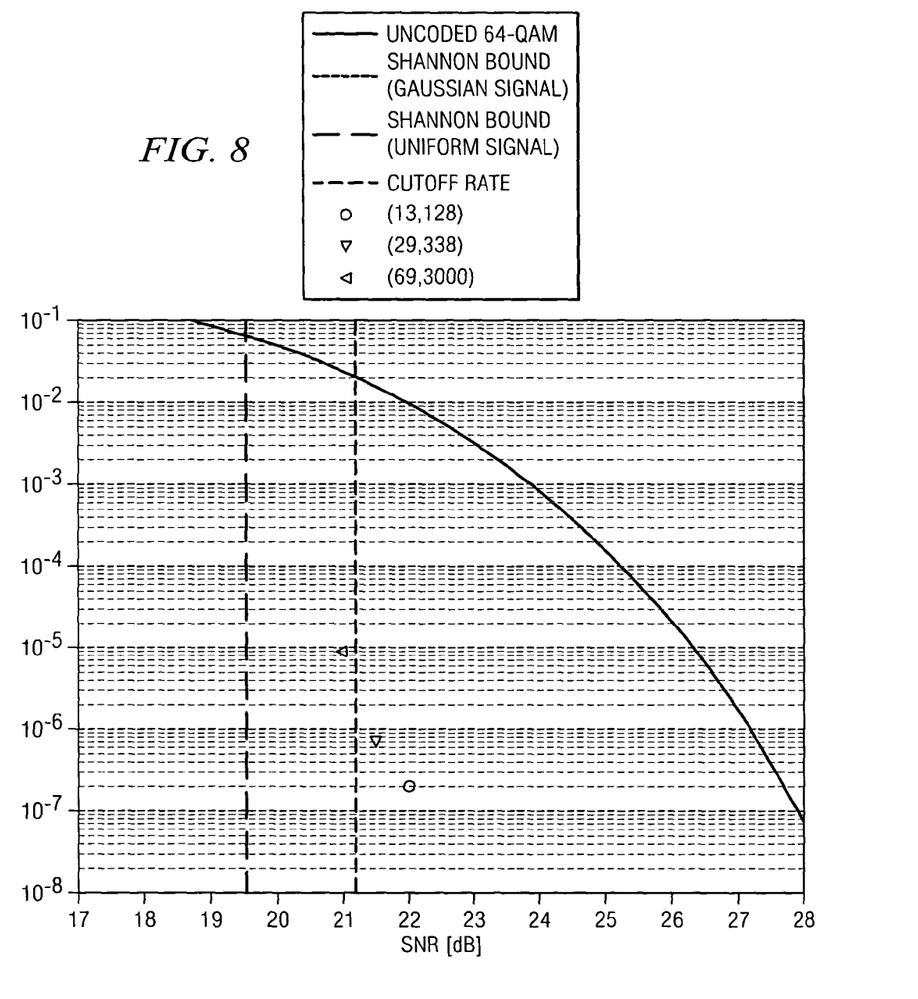
FIG. 8 illustrates simulation test results associated with the ISI coder shown in FIG. 1 showing Event Error Rate versus the Signal to Noise Ratio of a sequential T-algorithm RSSD for an ISI pattern $F(z)$ that has three zeros at $z=-0.95e^{j\pi/8}$.

FIG. 8 shows the error event rate versus Es/NO of a sequential T-algorithm RSSD for the same ISI pattern used in FIG. 7. The sequential T-algorithm is a T-algorithm that automatically senses an error event (by a sudden rise in the average list size), and than goes back in time and re-process the potentially erred signal segment with a higher T and a higher list size (which allows reducing the CPL probability). Again, the numbers in "( )" are the average number of paths per symbol and the maximum list size (in case of increased T). This yields a very efficient algorithm in term of its average number of operations, as long as the SNR is higher than the cutoff rate.

In view of the above, it can be seen the present invention presents a significant advancement in the channel coding art.

It should be apparent that the present invention represents a significant departure from the prior art in construction and operation. However, while particular embodiments of the present invention have been described herein in detail, it is to be understood that various alterations, modifications and substitutions can be made therein without departing in any way from the spirit and scope of the present invention, as defined in the claims which follow.

What is claimed is:

1. A inter-symbol-interference (ISI) coder comprising:
   a mapper operational to map at least one sequence of input symbols selected from a lattice into a set of multiple sequences of extended symbols and to select the extended symbols from the same lattice associated with the input symbols to yield a same minimum distance; and
   a linear ISI filter operational to generate coded output symbols in response to the set of multiple sequences of extended symbols.

2. The ISI coder according to claim 1, wherein the linear ISI filter is selected from the group consisting of an finite impulse response (FIR) filter, and
   an infinite impulse response (IIR) filter.

3. The ISI coder according to claim 1, wherein the linear ISI filter is configured such that its convolution with a channel impulse response yields a desired ISI generating pattern.

4. The ISI coder according to claim 1, wherein the mapper has a transform that is invertible such that no two input sequences are mapped into the same sequence of extended symbols.

5. A method of channel coding, the method comprising:
   mapping at least one input symbol sequence selected from a lattice into a set of multiple sequences of extended symbols;
   generating coded output symbols in response to the set of multiple sequences of extended symbols; and
   selecting the extended symbols from the same lattice associated with the input symbols to yield a same minimum distance.

6. The method according to comprising
   convolving a linear filter with an associated channel impulse response to yield a desired inter-symbol-interference (ISI) generating pattern.

\* \* \* \* \*